Dec. 15, 1953  G. K. TEAL  2,662,852
PREPARATION OF TWO-SIDED MOSAIC SCREEN
Filed Dec. 29, 1948  3 Sheets-Sheet 1
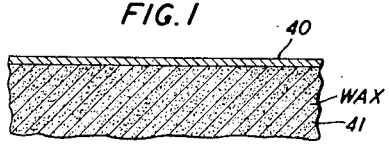
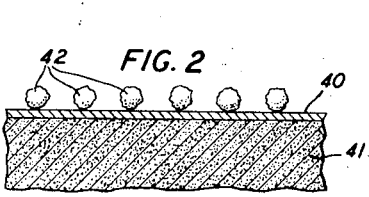
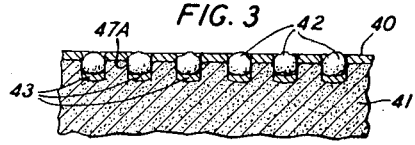
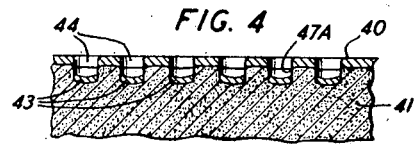
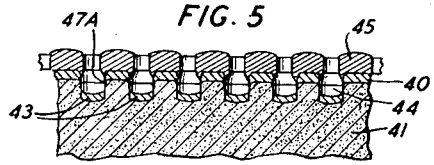
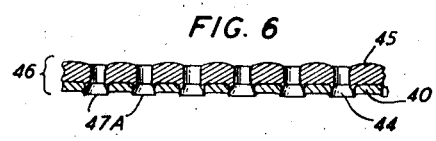
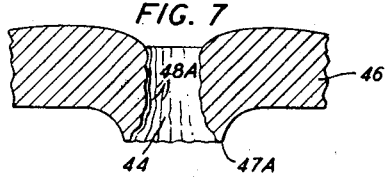
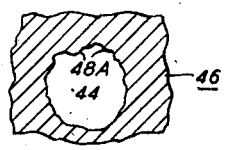
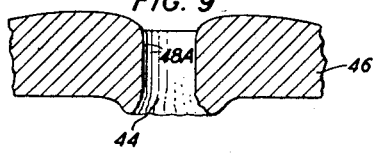
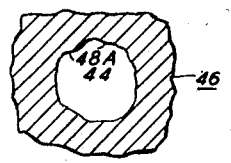
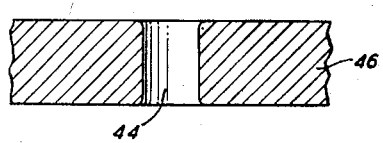
INVENTOR
G. K. TEAL
BY
Hugh S. Wertz
ATTORNEY Dec. 15, 1953 G. K. TEAL 2,662,852
PREPARATION OF TWO-SIDED MOSAIC SCREEN
Filed Dec. 29, 1948 3 Sheets-Sheet 2
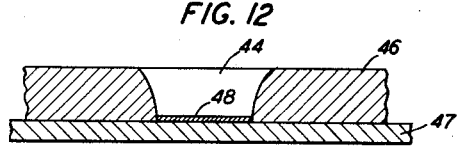
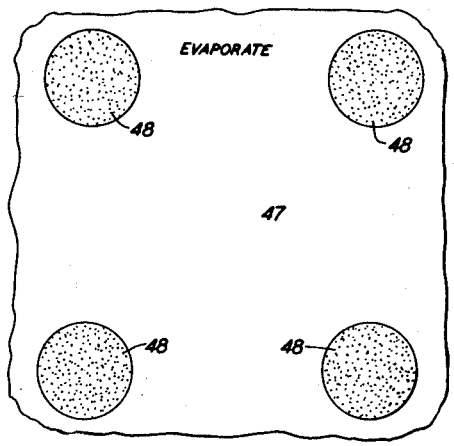
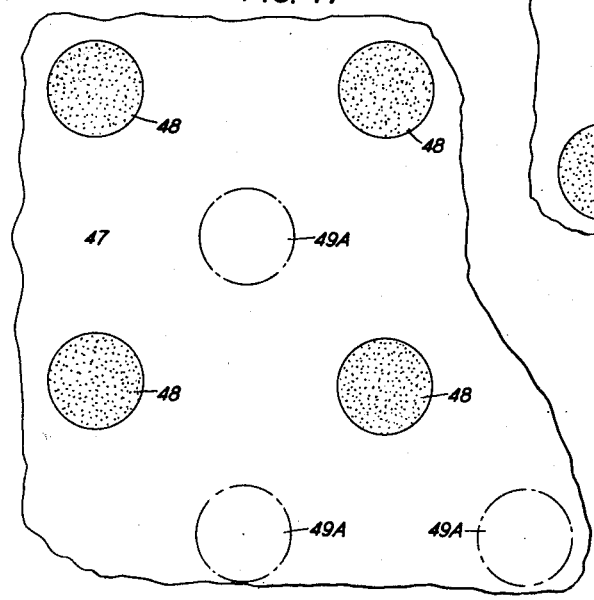
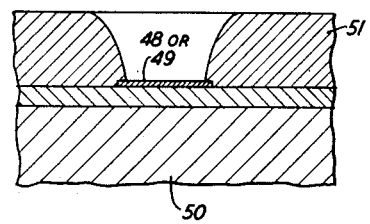
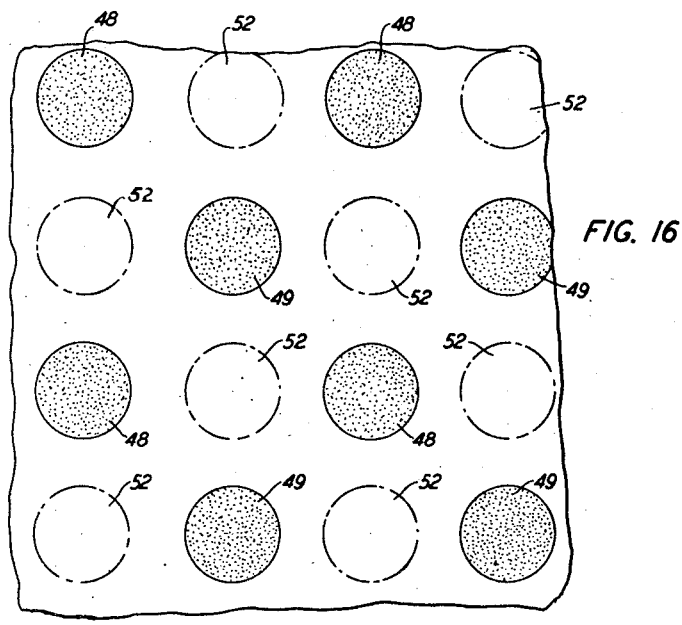
INVENTOR
G. K. TEAL
BY
ATTORNEY Dec. 15, 1953  G. K. TEAL  2,662,852
PREPARATION OF TWO-SIDED MOSAIC SCREEN
Filed Dec. 29, 1948  3 Sheets-Sheet 3

INVENTOR
G. K. TEAL
BY
Hugh S. Wertz
ATTORNEY

Patented Dec. 15, 1953

2,662,852

UNITED STATES PATENT OFFICE 2,662,852

PREPARATION OF TWO-SIDED MOSAIC SCREEN

Gordon K. Teal, Summit, N. J., assignor to Bell Telephone Laboratories, Incorporated, New York, N. Y., a corporation of New York Application December 29, 1948, Serial No. 67,917

2 Claims. (Cl. 204—3)

This invention relates to electro-optical devices and more specifically to methods of making target or screen structures for use in television transmitter tubes.

It has long been recognized in the development of electron camera tubes for generating picture signals at a television transmitting station that there are many advantages in projecting an electron image of the object for transmission onto one side of the screen of the tube and scanning the opposite side of the screen with a cathode ray beam formed in the tube. An example of a camera tube employing such a "two-sided" target or screen is the so-called "image orthicon" tube, described in an article entitled "The Image Orthicon—A sensitive Television Pick-up Tube" by Albert Rose, Paul K. Weimer and Harold B. Law, appearing in the July 1946 issue of the Proceedings of the I. R. E., beginning on page 424. The two-sided target makes possible the separation of charging and discharging processes so that the sensitizing procedures and electric fields appropriate to each can be incorporated in the tube without mutual interference. The target must conduct charges between its two sides or surfaces but not along either surface. Moreover, it should have a conducting element therein or nearby to act as the common capacitor plate for the separate picture elements. It has been found very difficult to construct satisfactory commercial targets of this type.

It is an object of the present invention to provide novel and improved methods for making two-sided electron camera tube targets which have a large number of discrete conducting elements per square inch.

In an exemplary method of making a two-sided mosaic target for camera tubes and the like in accordance with the invention, an apertured metallic screen is formed by pressing a number of very hard, small particles into a thin metal film; the apertured thin film is thickened, the resulting screen is electrolytically polished, its apertures are filled with silver oxide by a sputtering process in which silver is bombarded in oxygen with high voltage discharges, and the silver oxide is then reduced to silver. This method produces a two-sided metallic mosaic screen having a multiplicity of insulated metallic plugs therein.

The invention will be more readily understood by referring to the following description taken in connection with the accompanying drawings forming a part thereof in which:

Figs. 1 to 6, inclusive, illustrate various steps in a method of forming an apertured metallic screen in accordance with the invention;

Figs. 7 to 11, inclusive, illustrate steps in the process of electrolytically polishing the screen shown in Fig. 6;

Figs. 12 to 16, inclusive, illustrate a method of increasing the number of holes in the screen shown in Fig. 11;

Figs. 17 to 20, inclusive, illustrate a method of filling the apertures in the screen shown in Fig. 16 with insulated plugs;

Figure 20:
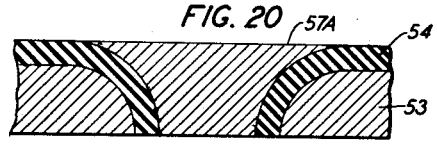
Figure 21:
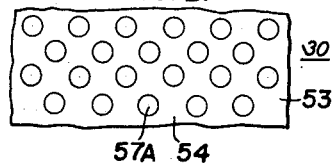
Fig. 21 is a top view of a schematic representation in greatly enlarged form of a portion of a target made in accordance with the invention.
Figure 22:
Fig. 22 is a sectional side view of portions of such target.

Referring more specifically to the drawings, Figs. 21 and 22 show, by way of example for purposes of illustration, portions of a two-sided mosaic target 30 suitable for use in certain television transmitting tubes, such as, for example, the image orthicon type of tube briefly referred to above. It will be understood that Figs. 21 and 22 are merely schematic showings and the same applies to the other figures in the drawings. Target 30 comprises a thin metallic screen 53 of a suitable metallic material having a large number of holes to the linear inch, e. g., four hundred per inch or more. One surface, such as the top surface in Fig. 22, and the interiors of all the apertures in the screen 53 are coated with an insulating material 54. The interiors of all these apertures are filled with metallic plugs 57A. Successive steps in the preparation of the screen or target 30 will be easily understood by referring to Figs. 1 to 20, inclusive, in some of which for simplicity in the drawings, the structure around one aperture only has been shown.

The first six figures of the drawings illustrate schematically a method of forming a metallic screen having a number of apertures therein. Fig. 1 shows a thin conducting layer 40 of platinum or other suitable material which is evaporated, sprayed, sputtered or otherwise deposited on a wax block 41. Very small particles of uniform diameter are insufflated upon the surface of the film 40. These particles 42 may be any hard particle, such as diamond, sapphire, iron, nickel or other solid. Fig. 2 shows these particles on the conducting film 40.

As shown in Fig. 3, the particles 42 are pressed into the metal film 40 with a roller or a smooth flat or curved plate. This breaks small areas of the metal 40 away from the main part of the conducting film leaving thereby a perforated screen on the surface of the wax. Small areas 43 of the screen are pressed into the wax block 41 and, as shown, angular projections 47A extend downward from around each perforation.

If the particles 42 are conductors such as iron or nickel, they may be dissolved with nitric or hydrochloric acids. If the particles 42 are insulating particles this step can be omitted.

As thick a coat of nickel is applied to the platinum screen 40 as is possible without closing up the holes 44. Any suitable method, such as electroplating, can be used. The coating 45 is shown in Fig. 5.

Let it be assumed that an enlarged side view of one of the apertures 44 and of its surrounding metal is shown in Fig. 7, and a large cross-section of the aperture 44 is shown in Fig. 8. It is obvious that the actual aperture 44 is by no means as smooth as is represented in Fig. 7. It has been shown in this manner merely for convenience and simplicity in the drawings. It will be noted that the metal screen 46 shown in Fig. 7 has angular projections 47A around the hole and also small irregular projections 48A. The screen 46 is then electrolytically polished by making it the anode in a solution of sulfuric acid and water (120 cc. $H_2SO_4$ to 80 cc. $H_2O$) at a high current density. This rounds off some of the projections and dissolves part of the nickel screen as indicated in Figs. 9 and 10 which otherwise correspond to Figs. 7 and 8, respectively. A thin film of metal is then electroplated upon the screen 46 and the polishing process is repeated and re-repeated as often as necessary to give the smooth screen 46 shown in Fig. 11. It will be noted that in Figs. 7 to 11, inclusive, no attempt has been made to show the various metal layers (such as, for example, layers 45 and 40) making up the screen, it being shown for simplicity merely as a solid metal screen 46.

Figs. 12 to 16, inclusive, illustrate a method of increasing the number of holes in the screen 46. As shown in Fig. 12, the metal screen 46 shown in Fig. 11 is placed upon and in intimate contact with a piece of thin filter material 47, such as paper, and a metal, such as aluminum, or other solid is evaporated through the holes 44 in the screen. This gives a pattern of thin solid dots 48 over the entire surface of the paper as indicated in Fig. 13. Obviously the dots are not perfect circles as shown in Fig. 13 but are shown thus for simplicity in the drawings.

The screen 46 is then shifted into position so that the holes 44 fall in the positions indicated by the clear circles 49A in Fig. 14, and a solid is evaporated through the holes in the screen while it is in this position to produce new thin solid dots 49 (shown in Fig. 16).

The metal screen 46 is then removed and the filter paper 47 upon which aluminum dots 48 and 49 have been superimposed is placed upon a filter cylinder 50 of sintered glass or glass containing a multiplicity of capillary holes, and a layer of silver oxide or copper oxide 51 is deposited upon the paper while vacuum is applied to the underside of the cylinder. The entire assembly is then placed in a reducing atmosphere and the silver oxide or copper oxide is reduced to silver or copper, the filter paper being burned away during the reducing process. The aluminum dots 48 and 49 are now etched out of the holes with concentrated potassium hydroxide solution giving a perforated metal screen having twice the number of holes possessed by the original screen.

The metal screen produced by the process illustrated by Figs. 12 to 15, inclusive, is now used in a repetition of this procedure to produce a metal screen having holes including those shown as 48 and 49 in Fig. 14 and also those shown in the positions of the dotted circles 52 in Fig. 16. This produces a screen shown as 53 in Fig. 17 which contains four times the total number of holes as the screen shown in Fig. 12 and twice the number of holes per linear inch as that shown in Fig. 12.

Figure 17:
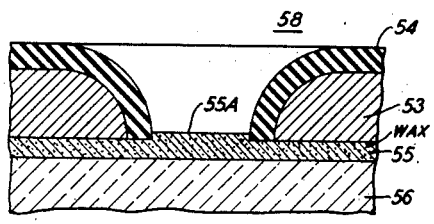
Figure 18:
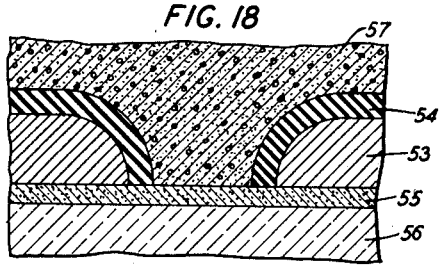
Figure 23:
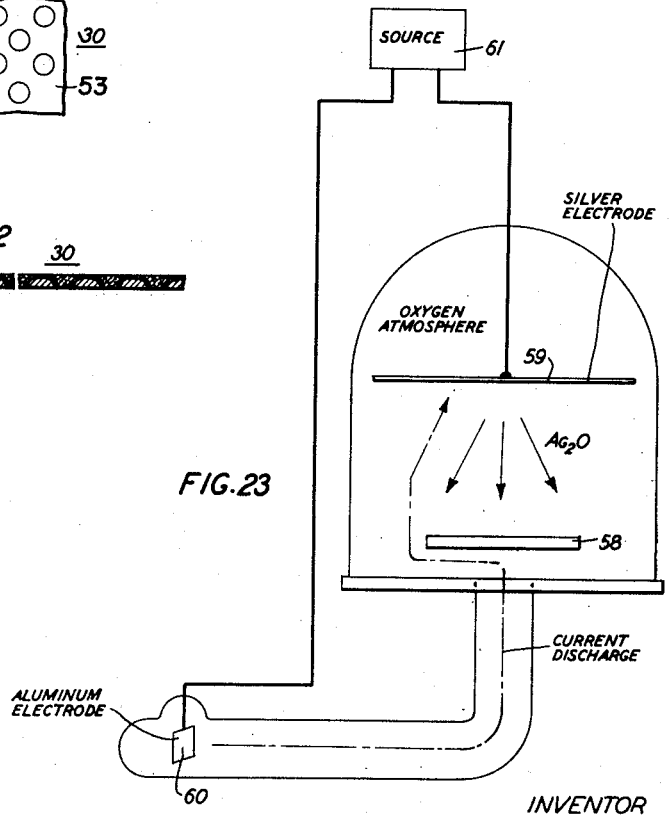
Figs. 23 shows apparatus used in carrying out the invention.

Figs. 17 to 20, inclusive, illustrate a method of filling the apertures in the screen 53 with insulated metallic plugs. Referring now to Fig. 17, the metal screen 53 is coated with insulating layer 54. This is obtained by evaporating a suitable substance such as cryolite on the top of the screen or by insufflating glass on the screen and then fusing it to give the coating 54. A uniform coating of beeswax, asphaltum or other adhesive 55 is applied to a fairly thick stiff piece of metal or glass 56. The adhesive is flowed on the metal or glass 56 by melting or by use of a solution of the adhesive in a solvent such as carbon tetrachloride. Evenness of spreading can be assured by spinning in a horizontal plane. The coated metal screen 53 is pressed onto the wax film 55 so that a small amount 55A of the wax is pushed into each hole of the screen as shown in Fig. 17. Silver oxide 57 is then applied to the surface of the unit of Fig. 17 by bombarding silver in oxygen with high voltage discharges. This can be accomplished in the apparatus shown in Fig. 23, wherein the unit 58 shown in Fig. 17 and represented schematically by a rectangle in Fig. 23 is mounted in the path between a silver electrode 59 and an aluminum electrode 60 in an oxygen atmosphere, and a source of high D. C. voltage 61 is connected between the two electrodes. Because of the oxygen atomsphere a multiplicity of silver oxide particles 57 is built up in the apertures of the unit 58.

Figure 19:
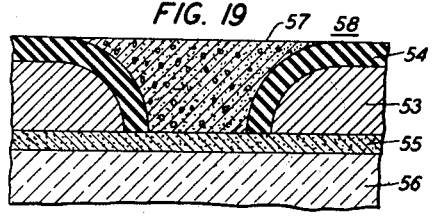

The excess silver oxide is then wiped off, leaving the silver oxide plugs 57 in the holes of the screen 53 as shown in Fig. 19. The unit is then heated up and the screen is removed from its supports.

The screen of Fig. 19 is then heated in hydrogen to reduce the silver oxide 57 to silver buttons 57A. Alternatively, it can be treated with a liquid reducing agent like one of those frequently used in photography, for example. This produces a screen one elemental portion of which is shown in Fig. 20 and another larger portion of which is shown, to a somewhat smaller scale, in Figs. 21 and 22.

Various alternative steps and procedures other than those mentioned above are of course possible without departing from the spirit of the invention, the scope of which is pointed out in the claims. The disclosed over-all process of making screens of the type shown in Figs. 21 and 22 is claimed in the present application; the methods disclosed herein (Figs. 1 to 6, inclusive) of forming an apertured metal screen of the type shown in Fig. 6 are claimed in a copending divisional application of the present inventor, Serial No. 123,873, filed October 27, 1949; the methods disclosed herein of electrolytically polishing apertured metal screens (Figs. 7 to 11, inclusive) are claimed in a copending divisional application of the present inventor, Serial No. 123,874, filed October 27, 1949; the methods disclosed herein of increasing the number of holes in aperture metal screens (Figs. 12 to 16, inclusive) are claimed in another copending divisional application of the present inventor, Serial No. 123,875, filed October 27, 1949, issued as patent number 2,596,617 on May 13, 1952; and the sputtering method disclosed herein and the apparatus used therefor (Figs. 17 to 20, inclusive, and 23) are claimed in still another copending divisional application of the present inventor, Serial No. 123,876, filed October 27, 1949.

What is claimed is:

1. The method of forming a two-sided mosaic screen or target comprising the steps of placing a large number of tiny hard particles on a metal layer, pressing the particles into and through said metal layer thereby forming a large number of apertures in the layer, applying a metal coating to said layer leaving a thickened apertured screen which has sharp metallic projections therein, electrolytically polishing the thickened screen to reduce said projections, electroplating said layer to increase the thickness thereof, insulating the inner surfaces of the apertures in the metal layer and forming metallic buttons in said insulated apertures.

2. The method of forming a two-sided mosaic screen or target comprising the steps of placing a large number of tiny hard particles on a metal layer, pressing the particles into and through said metal layer thereby forming a large number of apertures in the layer, applying a metal coating to said layer leaving a thickened apertured screen which has sharp metallic projections therein, electrolytically polishing the thickened screen to reduce said projections, electroplating said layer to increase the thickness thereof, repeating said electrolytic and electroplating steps a plurality of times until smooth apertures in a metal layer of desired thickness are produced, insulating the inner surfaces of the apertures in the metal layer and forming metallic buttons in said insulated apertures.

GORDON K. TEAL.

References Cited in the file of this patent

UNITED STATES PATENTS

| Number | Name | Date |
| --- | --- | --- |
| 1,792,197 | Stresan | Feb. 10, 1931 |
| 2,103,623 | Kott | Dec. 28, 1937 |
| 2,163,480 | Burkhardt et al. | June 20, 1939 |
| 2,175,701 | Rose | Oct. 10, 1939 |
| 2,225,733 | Beebe | Dec. 24, 1940 |
| 2,352,968 | Orton | July 4, 1944 |
| 2,412,058 | Pfeil | Dec. 3, 1946 |
| 2,496,299 | Mansfield et al. | Feb. 7, 1950 |
| 2,496,961 | Schneider | Feb. 7, 1950 |
| 2,596,617 | Teal | May 13, 1952 |
| 2,596,618 | Teal | May 13, 1952 |